Aug. 25, 1964  W. R. SHAVER  3,145,667
THRESHOLD STRUCTURE AND METHOD FOR FORMING THE SAME
Filed Sept. 28, 1961  2 Sheets-Sheet 2
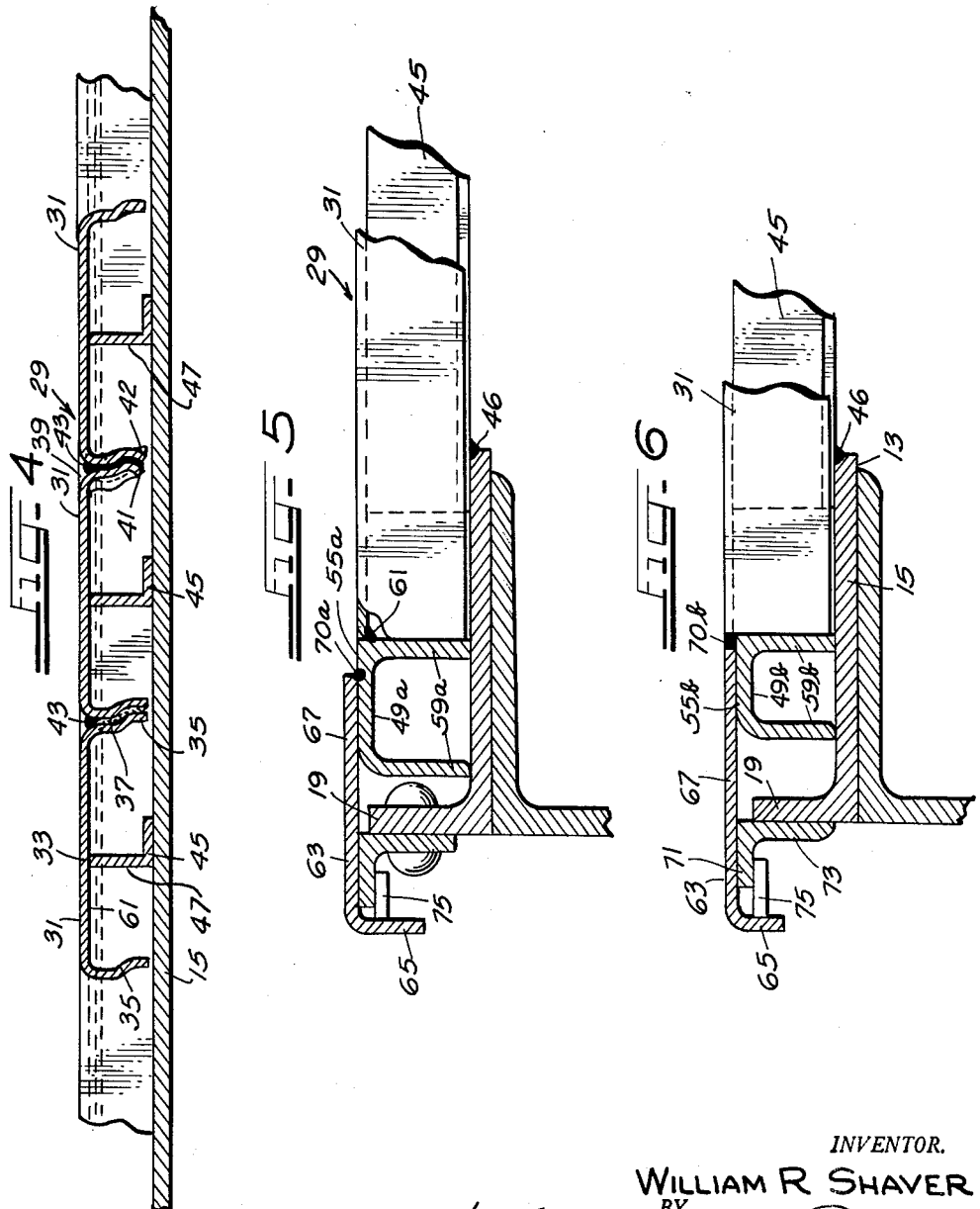
INVENTOR.
WILLIAM R SHAVER — # United States Patent Office 3,145,667
Patented Aug. 25, 1964

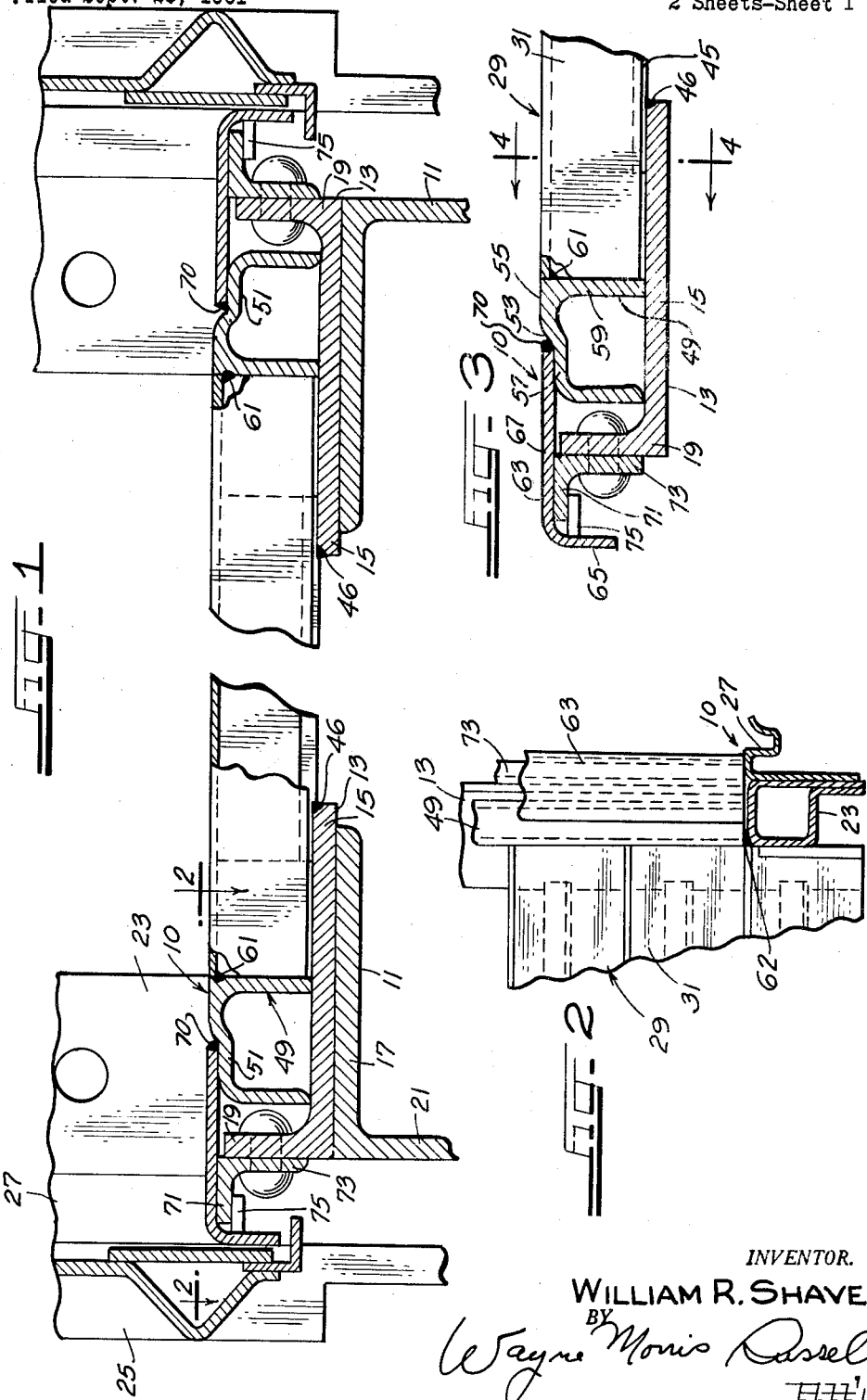

3,145,667
THRESHOLD STRUCTURE AND METHOD
FOR FORMING THE SAME
William R. Shaver, Hammond, Ind., assignor to Pullman
Incorporated, Chicago, Ill., a corporation of Delaware
Filed Sept. 28, 1961, Ser. No. 141,454
3 Claims. (Cl. 105—422)

This invention relates to thresholds employed in the doorways of railway cars and more particularly to a new and improved threshold structure and the method for forming the same.

Heretofore, threshold structures generally have been constructed of a preformed unitary structure which is attached to the usual side sill and post assembly defining the door opening and permanently fixed therein as by welding. As is well-known, the threshold is usually formed with a vertical web portion which is arranged to lie closely adjacent the inner wall of the door so as to form a seal and is also formed with a horizontal web portion fitted relative to the end of the car floor planks. This unitary type of threshold structure has created difficulties for several reasons, particularly with respect to the fitting of the threshold so that the horizontal web portion closely abuts or overlaps the floor board, and at the same time maintains the vertical web positioned to form an effective seal adjacent the door. Oftentimes with the preformed unitary threshold structure employed heretofore when the vertical web is positioned so that a seal is properly formed at the door, the horizontal web of the threshold is of such length that an opening is created between the threshold structure and the end of the plank. Under these circumstances a filler of suitable material is required to close the opening. The use of a filler is undesirable for many reasons and primarily because it requires custom fitting of the filler which is time consuming and expensive.

The problem of fitting the threshold to the end of the floor plank is particularly acute when nailable steel flooring is employed in the railway car since such flooring is usually attached at its ends by welding to the horizontal web portion of the threshold. It should be readily apparent that if the horizontal web portion of the threshold is spaced from the end of the floor board a problem of providing an adequate and firm weld to join the floor board to the threshold is created.

It is an object of the present invention to provide a threshold structure which overcomes the difficulties above described and which is constructed and arranged so as to accommodate the threshold structure to cars of different widths so that the threshold properly fits the end of each of the floor planks adjacent the doorway as intended without the use of fillers.

It is another object of the invention to provide a threshold structure which is particularly suitable for use with nailable abutting steel flooring and so constructed as to form a tight abutting fit with floor plank structures and thereby assure a firm weld seam.

It is still a further object to provide a threshold structure constructed and arranged in a manner so as to minimize the welding at the juncture of the threshold with the usual doorpost defining the doorway.

It is another object to provide a new and novel method for installing the threshold structure so as to accommodate the structure to the floor plank structure in a manner to form a snug abutting fit at each of the ends of the floor plank structure so as to preclude the necessity of providing a filler material between the floor plank and the threshold structure.

It is another object to provide a new and novel method for installing a threshold structure in railway cars employing nailable steel floor plank structures.

Briefly, the present invention provides a threshold structure for a railway car having a side sill formed by an angle member having a vertical flange and a horizontal flange comprising essentially a support member arranged on the side sill and formed to provide a surface abutting against the end of the floor plank structure supported on the side sill and also to provide a support for a threshold plate which is constructed so that it may be selectively positioned on the support member so that the usual vertical web is located adjacent the door to form a seal therewith.

The novel method of the present invention comprises essentially the steps of assembling the threshold in the usual opposed doorways of the car so that the threshold support members of the threshold are in abutting relation with the floor board structure and fastening the threshold plates to the supports so as to form a seal with the door associated with each of the doorways.

Further objects and features will hereinafter appear.

In the drawings:

FIG. 1 is a fragmentary vertical transverse section of the lower portion of two doorways disposed on opposite sides of a railway freight car with each of the doorways embodying the improved threshold structure of the present invention.

FIG. 2 is a plan section taken along the line 2—2 of FIG. 1, showing an end of the doorway and the associated doorpost.

FIG. 3 is a detailed section of one doorway similar to FIG. 1, but including only the threshold structure and the immediate adjoining parts.

FIG. 4 is a detailed section taken through the line 4—4 of FIG. 3 and illustrating the manner in which the floor boards are attached to the threshold structure.

FIG. 5 is a view similar to FIG. 3 showing a second embodiment of the present invention.

FIG. 6 is a view similar to FIG. 5, showing still another modification of the invention.

Referring now to the figures, there is shown, a more or less standard freight car construction having a doorway disposed on opposite sides of the car and employing the threshold structure 10 of the present invention. Each of the doorways includes a stiffening member 11, well-known in the art as a bulb angle, on which there is mounted a lengthwise running side sill angle 13 having its horizontal flange 15 fixed to the horizontal flange 17 of the bulb angle 11 and its vertical flange 19 substantially coplanar with the vertical web 21 of the bulb angle. Each doorway is defined by a pair of spaced doorposts 23 of which only one is shown, and is closed by a sliding door 25 which abuts a vertical doorstep 27 and slides on rollers along a track (not shown) in the well-known manner.

Supported on the horizontal flanges 15 of each of the side sills 13 adjacent door openings is a floor plank structure 29 which in the preferred form shown, is a nailable metal floor plank structure or units 29 as for example steel planks of the type more specifically described in Patent No. 2,900,055, assigned to the assignee of the present invention and to which reference is made for a more detailed description thereof. As shown in detail in FIG. 4 the nailable steel floor plank structure 29 includes generally a plurality of side-by-side juxtaposed metal plank members 31 each having a horizontal web 33 and spaced depending flanges 35 on each side thereof. The depending flanges 35 of adjacent planks 31 are disposed in closely spaced relation so as to provide a nailing groove 37 therebetween and one of the adjacent flanges 35 of each of the planks 31 is provided with a spacer embossment 39 formed thereon extending toward the other flange into the groove 37. The other adjacent flange 37 is provided with a portion overlying the embossment so as to prevent relative vertical displacement of the members 31 in one direction. The embossment includes a reversely bent portion 41 which cooperates with a reversely bent portion 42 in the other flange complementary to the first named reversely bent portion to prevent relative vertical displacement of the plank members in the other direction. In this manner the horizontal webs are maintained substantially coplanar. The individual floor planks are attached as by welding 43 to form the floor plank units 29.

The floor plank units 29 are mounted on the side sills by an intermediate support member or angle 45 previously attached to the floor planks and extending transversely of the car and supported and fixed as by a weld 46 at either end by the opposing side sills 13. It is to be noted that the vertical flange 47 of the angle 45 is arranged so that the depending flanges 35 of the plank are spaced above the horizontal flange 15 of the side sill 13 so that the angle 45 forms the sole support for the planking 29 within the car. For a more detailed description of the arrangement of the angle 45 relative to the floor plank 31, reference is made to U.S. Patent No. 2,910,016, assigned to the assignee of the present invention. While the invention herein described is particularly adaptable for use with the above described nailable metal floor plank units 29, it should be understood that the invention may also be employed with other types of flooring structure constructed of other metals, wood and the like.

The above described structure is more or less standard in railway car construction employing a nailable metal floor. In accordance with the present invention, there is provided a threshold structure 10 for eliminating the difficulties encountered heretofore, particularly with respect to the attachment of the threshold to the floor paneling and to side sills. The threshold structure 10 includes a support member 49 which as shown in FIGS. 1–3 is formed from a channel of substantially U-shaped cross-section having an upper substantially horizontal support bight portion 51 having an indentation 53 to provide two step-like horizontal surfaces 55 and 57 of which the former lies substantially coplanar with the top of the floor planks 31; and includes a pair of spaced downwardly depending legs 59 which rest upon the upper side of the horizontal flange of the sill. The support member 49 is located between the doorposts so that one of the legs 59 abuts the terminal edges of each of the floor planks 31 and is fixed to the latter as by way of welding 61 along the inside edges of each of the floor planks 31 and along the inside of one of the depending flanges 35. The support 49 is also welded to the doorposts at the inner corners by a weld 62. In this manner, a firm weld and a close abutting fit is obtained along the mating surfaces of the legs 59 of the support member 49 and the edge of the floor plank structure 29.

Mounted on the support member 49 is a threshold plate 63 including a vertical web 65 positioned in close proximity to the door to form a seal therewith and a horizontal web 67 supported on the lower horizontal surface 57 of the support member 49 so that its upper surface lies substantially flush with the upper horizontal surface 55 and thereby the top of the floor planks 31. The threshold plate is held fixed to the support by a weld 70 conveniently disposed adjacent the indentation 53 so as to provide a substantially continuous uninterrupted surface between the floor boards and the threshold. The plate is supported adjacent its vertical web 65 by way of a horizontal flange 71 of an angle 73 fixed to the vertical flange 19 of the side sill 13 by suitable means such as a rivet. For the purpose of holding the threshold plate clamped on the angle the vertical web 65 is formed with spaced clip-like members 75 arranged to snugly grip the horizontal flange 71 of the angle 73.

Referring now to FIG. 5 showing a further embodiment of the threshold structure and wherein like parts are designated alike, the support 49a is substantially identical to the support 49 of the embodiment illustrated in FIG. 2 with the exception that the horizontal bight 55a thereof is not formed with step-like surfaces but only with a single planar surface. With this type of support the upper surface of the horizontal web 67 of the threshold plate 63 which is identical to the plate shown in FIGS. 1–3, extends above the top of the floor planks 31. It is to be noted, however, that the weld 70a along the terminal edge joining the horizontal web 67 to the support 49 provides a gradually tapering surface so as to obviate a sharp ridge.

Referring to FIG. 6, there is shown a further embodiment of the invention and wherein like parts are designated alike in which the support 49b is configured substantially the same as the prior embodiments with the exception that each of the legs 59b are of such length so that the bight 55a supports the horizontal web 67 of the threshold plate substantially flush with the upper surface of the floor plank. The support 49b may be fixed to the sill 15 as by welding (not shown) along the leg if desired. The free edge of the horizontal web 67 is maintained spaced from the ends of the floor plank 31 and a weld 70b which is applied in the space so as to lie flush with the threshold plate and the floor planks thereby to unite the threshold plate, support, and floor plank structure.

In accordance with the present invention, it is proposed to form the threshold of any one of the above described embodiments in a novel manner so as to preclude the difficulties encountered heretofore, particularly with respect to the problem of fitting the ends of the floor plank structure with the threshold when there exist conditions such as a variation in the length of the floor plank structure, and difference in width of the side sills and the like. This is accomplished by hanging one of the doors 25 on one side of the car and placing the threshold support 49 on the side sill so that the legs 59 are arranged parallel to the vertical flange of the side sill. The threshold plate 63 is clipped on the flange support 71 and positioned on the lower surface 57 of the support so that the vertical web 65 lies in close contacting engagement with the inner side of the door and the weld 70 is applied at the junction of the indentation 53 with the edge of the horizontal web 67. The support is also welded to each of the posts of the doorway at one corner thereof as shown in FIG. 2. In this connection it is to be noted that the weld 70 does not extend the width of the doorpost but is applied only at the corners. Thereafter the floor plank structure 29 including the angles 45 which is conveniently assembled in sections or units is placed such that the angles 45 are supported on the side sills 11 and positioned so that the ends of the floor planks 31 adjacent the assembled threshold assembly abut thereagainst. With the one end of the floor plank structure thus positioned the flooring may be longitudinally jacked for alignment with other floor plank sections previously installed. This jacking is possible because the support member 49 is not fixed to the sill. Thereafter the components are affixed by the welds 61 and 70 along the underside of the horizontal web and along the inner side of one of the vertical flanges as shown and the intermediate support members 45 are fixed to the side sill.

Thereafter, the threshold support on the other side of the car is located on the horizontal flange of the sill so that a leg 59 thereof abuts the opposite end of the planks to preclude a space or opening between the end of the plank and the support. The threshold support 49 is then welded to the floor planks 31 similarly to the opposite end along the underside of the horizontal web portion and one of the flanges and is welded to the doorpost at each inner corner. The threshold plate is then positioned on the support so that the vertical web 65 is in contact with the inner surface or side of the door 25 in the opposite doorway. When the threshold plate 63 is located so as to assure the formation of a seal at the door the horizontal web is welded to the support along the terminal edge thereof as described in connection with the formation of the threshold in the opposite doorway. At the same time the other end of the intermediate support 45 may be welded to the side sill.

The threshold structures disclosed in the embodiments of FIG. 5 and FIG. 6 are similarly formed in the doorways with the exception, of course, that the vertical web is not positioned on a step-like bight portion 55 as in the embodiments of FIGS. 1-4.

From the foregoing, it should be readily apparent that a threshold structure has been formed in which there is an assurance that the vertical flanges of each of the threshold plates are in contact with the doors on the opposite sides of the railway car to form the required seal therewith, and at the same time forming a tight abutting joint with the floor board.

What is claimed is:

1. In a railway box car having opposed doorway frames extending upwardly from side sills, said car further including a metal floor plank structure having a plurality of planks extending transversely of said car between said frames with opposite ends of said plank structure being spaced inwardly of said side sills, the provision of a threshold arrangement extending longitudinally of each side sill within said frames, said threshold arrangement comprising a longitudinal metal threshold support member in the space between an end of said plank structure and a side sill, said support member being of lesser width than said space and including a horizontal top surface portion substantially coplanar with the top surface of said plank structure and in abutment with adjacent ends of the planks of said plank structure, a longitudinal metal threshold plate including a horizontal web and outer edge depending web co-extensive with said support member, said depending web being outboard of said side sill and said horizontal web extending over said side sill in resting relation thereon and into overlapping engagement with the top surface portion of said support member in longitudinally spaced relation with the ends of the planks of said plank structure, means connecting said threshold plate and side sill against vertical displacement of said threshold plate, the continuity of said threshold plate and side sill being uninterrupted by said connecting means, and longitudinally extending weld means marginally fixing said support member to said plank structure along the coplanar surfaces thereof and marginally fixing said horizontal web to said top surface portion of said support member, whereby the space between an end of said plank structure and a side sill is spanned and sealed and said threshold plate is fixedly mounted over said side sill through a doorway frame, said weld means constituting the sole means for fixing of said support member and for fixed attachment of said threshold arrangement to said plank structure, the weld means fixing said horizontal web extending accessibly along the exposed top surface area of said threshold arrangement.

2. The box car of claim 1 wherein the top surface portion of said support member is of longitudinally extending step-like configuration including a recessed area in which the horizontal web of said threshold plate is received in coplanar relation with the top surface of said plank structure, said weld means consisting of a continuous weld along the edge of said horizontal web fixing said threshold plate to said support member and a weld fixing said support member to said plank structure.

3. The box car of claim 1 wherein the horizontal web of said threshold plate extends over the top surface portion of said support member with its outer margin in close association with the adjacent end of said plank structure, said weld means consisting of a single continuous weld filling the space between said horizontal web and plank structure and fixing together said web, support member and plank structure.

References Cited in the file of this patent
UNITED STATES PATENTS

| | | |
|---|---|---|
| 1,900,711 | Howard | Mar. 7, 1933 |
| 2,468,185 | Doyle | Apr. 26, 1949 |
| 2,543,402 | Doke | Feb. 27, 1951 |
| 2,718,288 | Boyer | Sept. 20, 1955 |
| 2,736,269 | Adler | Feb. 28, 1956 |
| 2,900,055 | Shaver | Aug. 18, 1959 |
| 2,948,026 | Shils | Aug. 9, 1960 |